United States Patent
Grosch et al.

(10) Patent No.: US 6,441,247 B1
(45) Date of Patent: Aug. 27, 2002

(54) METHOD FOR PREPARING POLYETHER POLYOLS

(75) Inventors: Georg Heinrich Grosch, Bad Dürkheim; Harald Larbig, Ludwigshafen; Reinhard Lorenz, Limburgerhof; Dieter Junge, Frankenthal; Kathrin Harre, Dresden, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/890,119

(22) PCT Filed: Jan. 21, 2000

(86) PCT No.: PCT/EP99/00449

§ 371 (c)(1),
(2), (4) Date: Jul. 26, 2001

(87) PCT Pub. No.: WO00/44813

PCT Pub. Date: Aug. 3, 2000

(30) Foreign Application Priority Data

Jan. 28, 1999 (DE) ......................... 199 03 274

(51) Int. Cl.$^7$ .................................. C07L 43/11
(52) U.S. Cl. ................... 568/620; 528/66; 568/624
(58) Field of Search .................. 568/620, 624; 528/66

(56) References Cited

U.S. PATENT DOCUMENTS

| 3,278,457 A | 10/1966 | Milgrom |
| 3,278,458 A | 10/1966 | Belner |
| 3,278,459 A | 10/1966 | Herold |
| 3,404,109 A | 10/1968 | Milgrom |
| 3,427,256 A | 2/1969 | Milgrom |
| 3,427,334 A | 2/1969 | Belner |
| 3,829,505 A | 8/1974 | Herold |
| 3,941,849 A | 3/1976 | Herold |
| 4,843,054 A | 6/1989 | Harper |
| 4,877,906 A | 10/1989 | Harper |
| 5,158,922 A | 10/1992 | Hinney et al. |
| 5,426,081 A | 6/1995 | Le-Khac |
| 5,470,813 A | 11/1995 | Le-Khac |
| 5,482,908 A | 1/1996 | Le-Khac |
| 5,498,583 A | 3/1996 | Le-Khac |
| 5,523,386 A | 6/1996 | Le-Khac |
| 5,525,565 A | 6/1996 | Le-Khac |
| 5,545,601 A | 8/1996 | Le-Khac |
| 5,777,177 A | 7/1998 | Pazos |
| 5,998,327 A | 12/1999 | Hofmann et al. |

FOREIGN PATENT DOCUMENTS

| DD | 203734 | 11/1983 |
| DD | 203735 | 11/1983 |
| DE | 148957 | 6/1981 |
| EP | 268922 | 6/1988 |
| EP | 283148 | 9/1988 |
| EP | 385619 | 9/1990 |
| EP | 654302 | 5/1995 |
| EP | 659798 | 6/1995 |
| EP | 665254 | 8/1995 |
| EP | 743093 | 11/1996 |
| EP | 755716 | 1/1997 |

OTHER PUBLICATIONS

PCT International Preliminary Examination Report Dated May 11, 2001.
PCT International Search Report Dated May 31, 2000.
Derwent Chem Abstract of DD 203734. (1983).
Derwent Chem Abstract of DD 203735. 1983).
Derwent Abstract of DD 148957. (1981).
Abstract of JP 7308583. (1995).
Abstract of JP 6248068. (1994).
Abstract of JP 4351632. (1992).

*Primary Examiner*—Michael L. Shippen
(74) *Attorney, Agent, or Firm*—Fernando A. Borrego

(57) ABSTRACT

The present invention relates to a process for the preparation of polyether polyols by catalytic reaction of H-functional initiators with lower alkylene oxides, wherein the catalysts used are multimetal cyanide compounds and the H-functional initiators used are butane-1,4-diol, α-hydroxy-ω-hydroxypoly(oxybutane-1,4-diyl), pentane-1,5-diol, decane-1,10-diol or mixtures of at least two of these compounds.

6 Claims, No Drawings

METHOD FOR PREPARING POLYETHER POLYOLS

The invention relates to a process for the preparation of polyoxyalkylene glycols by catalytic reaction of H-functional initiators with lower alkylene oxides.

Polyoxyalkylene glycols are used in large amounts for the preparation of polyurethanes. They are usually prepared by catalytic addition of lower alkylene oxides, in particular ethylene oxide and propylene oxide, to H-functional polymerization initiators. The catalysts used are mostly alkali metal hydroxides or salts, of which potassium hydroxide is of greatest industrial significance.

In the synthesis of polyoxyalkylene glycols having long chains and hydroxyl values of from ca 26 to ca 60 mg of KOH/g, such as are used, in particular, for the preparation of flexible polyurethane foams, chain growth is accompanied by side reactions which cause irregularities in the chain structure. These by-products are referred to as unsaturated components and lead to impairment of the properties of the resulting polyurethane materials. In particular, such unsaturated components exhibiting an OH functionality of 1, give rise to the following:

- by reason of their low, in some cases very low, molecular weight, they are volatile and thus increase the total content of volatile matter in the polyoxyalkylene glycol and in the polyurethanes, in particular flexible polyurethane foams, prepared therefrom;
- they act as chain stoppers during production of polyurethane, because they slow down or reduce the cross-linkage of polyurethane or the build-up of molecular weight of polyurethane;
- they reduce the effective OH functionality of the synthesized polyoxyalkylene glycols; thus commercial polyether polyalcohols used for flexible foams and initiated with glycerol and catalyzed with potassium hydroxide have an effective OH functionality of only approximately 2.1 to 2.6, although the glycerol used is a trifunctional polymerization initiator.

It is therefore industrially very desirable to avoid unsaturated components as far as possible. On the other hand, many, in some cases complex, polyurethane formulations are set to accommodate polyoxyalkylene glycols having OH functionalities of from 2.1 to 2.6. It is therefore desirable to prepare polyoxyalkylene glycols having OH functionalities of from 2.1 to 2.6 but having only a minimum of unsaturated components.

Hitherto there has been no lack of attempts to provide polyoxyalkylene glycols having a low content of unsaturated components. Attempts to achieve this end particularly involve changing the alkoxylation catalysts used. Thus EP-A 268,922 proposes the use of caesium hydroxide. This makes it possible to lower the concentration of unsaturated portions, but caesium hydroxide is expensive and difficult to dispose of.

Furthermore, it is known to use multimetal cyanide catalysts, mainly zinc hexacyanometallates, for the preparation of polyoxyalkylene glycols having low contents of unsaturated components. A great many documents describe the preparation of such compounds. Thus DD-A 203,735 and DD-A 203,734 describe the preparation of polyoxyalkylene glycols using zinc hexacyanocobaltate. By using multimetal cyanide catalysts it is possible to lower the content of unsaturated components in the polyoxyalkylene glycol to from ca 0.003 to 0.009 meq/g; in the case of conventional catalysis using potassium hydroxide approximately 10 times this amount (from ca 0.03 to 0.08 meq/g) is found.

In addition, the preparation of zinc hexacyanometallates is known. Usually the preparation of these catalysts is carried out by causing solutions of metal salts, such as zinc chloride, to react with solutions of alkali metal or alkaline earth metal cyanometallates, such as potassium hexacyanocobaltate. To the resulting suspension of precipitated matter there is usually added, immediately after the precipitation process, a water-miscible component containing heteroatoms. This component may be present in one or both of the educt solutions. This water-miscible component containing heteroatoms can be, for example, an ether, a polyether, an alcohol, a ketone or a mixture thereof. Such processes are described for example in U.S. Pat. No. 3,278,457, U.S. Pat. No. 3,278,458, U.S. Pat. No. 3,278,459, U.S. Pat. No. 3,427,256, U.S. Pat. No. 3,427,334, U.S. Pat. No. 3,404,109, U.S. Pat. No. 3,829,505, U.S. Pat. No. 3,941,849, EP 283,148, EP 385,619, EP 654,302, EP 659,798, EP 665,254, EP 743,093, EP 755,716, U.S. Pat. No. 4,843,054, U.S. Pat. No. 4,877,906, U.S. Pat. No. 5,158,922, U.S. Pat. No. 5,426,081, U.S. Pat. No. 5,470,813, U.S. Pat. No. 5,482,908, U.S. Pat. No. 5,498,583, U.S. Pat. No. 5,523,386, U.S. Pat. No. 5,525,565, U.S. Pat. No. 5,545,601, JP 7,308,583, JP 6,248,068, JP 4,351,632 and U.S. Pat. No. 5,545,601.

DD-A 148,957 describes the preparation of zinc hexacyanoiridate and the use thereof as catalyst for polyether polyalcohol synthesis. Hexacyanoiridic acid is used as starting material. This acid is isolated as a solid and used in this form.

EP-A 862,947 describes the preparation of other double-metal cyanide complexes, in particular the use of cyanocobaltic acid or an aqueous solution thereof, as educt. The double-metal cyanides produced according to the teaching of EP-A 862,947 show high reactivity for ring-opening polymerization of alkylene oxides.

Multimetal cyanide catalysts show extremely high polymerization rates and make it possible to achieve high space-time polymerization yields. However, the use of multimetal cyanide catalysts involves considerable restrictions as regards the H-functional polymerization initiators that can be used. There are two types of initiators.

Some polymerization initiators are suitable for the so-called batch initiating method. These polymerization initiators, referred to below as batch starters, are placed in the reactor as the initial component of the batch and are freed from oxygen by repeated nitrogen purges and de-watered in vacuo at $\leq 1$ mbar over a period of from 30 to 120 min at from 50° to 120° C., the de-watering time and de-watering temperature depending on the boiling point of the batch starter. The multimetal cyanide catalyst is then added and the nitrogen purge and de-watering are repeated, if necessary. Following the addition of the alkylene oxide, compounds that are suitable for use as batch starters cause, at reactor temperatures of from 90° to 140° C., commencement of the polymerization reaction, noticeable from a pressure drop in the reactor, after a time lapse of from a few minutes to, at most, 2 hours. If the reaction does not start within a period of 2 hours, the polymerization initiator is not suitable for use as a batch starter.

In practice it is found that the following polymerization initiators are especially suitable for use as batch starters: castor oil and fatty alcohols such as 1-dodecanol. However, polyetherols primed with fatty alcohols are unsuitable for the preparation of flexible PU foam. Castor oil is theoretically suitable for use as a polymerization initiator for polyetherols for the production of flexible foams, but it is not available in sufficient quantities or at consistent quality. Batch starters of particular significance are ethoxylates and propoxylates having molar masses ≦400 dalton. These polymerization initiators usually have to be prepared by alkoxylation of low-molecular initiators, such as ethylene glycol, diethylene glycol, propylene glycol, dipropylene glycol, in particular glycerol and trimethylol propane, with alkaline catalysts such as KOH. Before these polymerization initiators can be used for polymerization using the multimetal cyanide catalysts, the alkaline catalyst must be removed quantitatively, which is economically disadvantageous.

When use is made of tripropylene glycol as the initiator it has been found that it itself and its alkoxylates having molar masses below 400 dalton are suitable for use as batch starters. However tripropylene glycol and its alkoxylates having molar masses of less than 400 dalton show less advantageous starting characteristics than eg a linear polypropylene glycol having a number-average molar mass of 400 dalton.

A considerable drawback of the processes of the prior art is the fact that a polymerization initiator that is so significant in industry, such as glycerol, and which is used as starter for most of the commercial polyols used in applications involving flexible polyurethane foams, is not suitable for use as a batch starter for the reason that the reaction does not start. Glycerol can indeed be added to a suitable batch starter in a concentration of 10 wt % or 20 wt % without hindering the start-up of the reaction, but this does not adequately overcome the aforementioned economical drawbacks.

Glycerol is suitable for the so-called addition method, however, as U.S. Pat. No. 5,777,177 discloses. In the addition method, the alkoxylation reaction is primed with a batch starter and, when the reaction has reached a steady state, there is added another polymerization initiator, such as glycerol, along with the alkylene oxides, in a quantity which is sufficiently small not to cause the reaction to stop. In order to achieve a sufficiently narrow molar-mass distribution of the polyetherol, the addition of the glycerol is completed well before the addition of the alkylene oxide.

Polymerization initiators which are not suitable for use as batch starters but can be used in the addition method are referred to below as addition initiators. Examples thereof are glycerol, propylene glycol and ethylene glycol.

However, the addition method requires changes to be made to the existing production plants so that it may be desirable to use only batch starters and nevertheless utilize all of the advantages of multimetal cyanide catalysis.

It is an object of the present invention to provide polymerization initiators which are suitable for use as batch starters and which make it possible to achieve high space-time yields of polyetherols using multimetal cyanide catalysts.

Surprisingly, it has been possible to achieve this aim by the use of butane-1,4-diol, α-hydroxy-ω-hydroxypoly (oxybutane-1,4-diyl), pentane-1,5-diol, decane-1,10-diol or mixtures of at least two of these compounds. Homologues such as propane-1,3-diol and hexane-1,6-diol were found to be unsuitable for use as batch starters, since the alkoxylation reaction did not start within a period of 2 hours under otherwise identical conditions. The compounds α-hydroxy-ω-hydroxypoly(oxybutane-1,4-diyl) belong to a class of materials comprising oligomers and polymers of butane-1, 4-diol, which can be prepared, for example, by the catalytic addition of tetrahydrofuran to butane-1,4-diol.

Accordingly, the invention relates to a process for the preparation of polyether polyols by catalytic reaction of H-functional initiators with lower alkylene oxides, wherein multimetal cyanide compounds are used as catalysts and butane-1,4-diol, α-hydroxy-ω-hydroxypoly(oxybutane-1,4-diyl), pentane-1,5-diol, decane-1,10-diol or mixtures of at least two of these compounds are used as H-functional initiators.

The invention also relates to the polyether alcohols produced by the process of the invention, to their use for the preparation of polyurethanes and to the polyurethanes manufactured therefrom.

Preference is particularly given to the use of butane-1,4-diol, α-hydroxy-ω-hydroxypoly(oxybutane-1,4-diyl) and pentane-1,5-diol as initiators. When these compounds are used as the initiators for the process of the invention the time lapse prior to start-up of the reaction is particularly short, so that the space-time, yield is particularly high. The molecular weight of α-hydroxy-ω-hydroxypoly(oxybutane-1,4-diyl) preferably ranges from 200 to 2500 g/mol.

In a preferred embodiment of the invention, the polymerization initiators employed in the process of the invention are used together with other H-functional initiators.

Due to this possibility of also using known, in particular trifunctional, initiators such as glycerol or trimethylol propane, the process of the invention can also produce polyether alcohols having a functionality ranging from 2.1 to 2.6, as commonly used for the preparation of flexible polyurethane foams. The quantity of the additional polymerization initiators used should be such that the final products exhibit the desired functionality, but should not exceed 10%, based on the polymerization initiator used, since it could then result in delayed start-up of the reaction. In one embodiment of the process of the invention, the polymerization initiators that are additionally used are reaction products of the said polymerization initiators with alkylene oxides. These reaction products preferably have a molecular weight in the range of from 300 to 600.

Alternatively, the known addition initiators, such as glycerol, can be metered to the reaction system following initiation of chemical addition of the alkylene oxides to the polymerization initiators used in the process of the invention. In this case the addition initiators can be introduced in a concentration of up to 200 mol %, based on the batch starter used. It is thus possible to prepare polyetherols having a functionality of up to 2.66.

The multimetal cyanide compounds used for the preparation of polyetherols of the invention are known to be very active catalysts for the preparation of polyfunctional polyethers.

Details on the synthesis and usage of these multimetal cyanide complexes for the preparation of polyfunctional polyethers are disclosed in the following documents:

U.S. Pat. No. 3,278,457, U.S. Pat. No. 3,278,458 and U.S. Pat. No. 3,278,459, U.S. Pat. No. 3,427,256, U.S. Pat. No. 3,427,334, U.S. Pat. No. 3,404,109, U.S. Pat. No. 3,829,505, U.S. Pat. No. 3,941,849, EP 654.302 and U.S. Pat. No. 5,470,813, EP 743,093, WO 97/23,544, WO 97/26,080, WO 97/29,146, WO 97/40,086, U.S. Pat. No. 5,714,428, U.S. Pat. No. 5,593,584, U.S. Pat. No. 5,527,880, U.S. Pat. No. 5,482,908.

Preparation of the multimetal cyanide compounds can be effected using the manufacturing processes disclosed in said specifications.

These manufacturing processes usually comprise the following process steps:

a) adding an aqueous solution of a water-soluble metal salt of the general formula $$M^1{}_m(X)_n,$$

in which

M$^1$ is at least one metal ion selected from the group comprising $Zn^{2+}$, $Fe^{2+}$, $Co^{3+}$, $Ni^{2+}$, $Mn^{2+}$, $Co^{2+}$, $Sn^{2+}$, $Pb^{2+}$, $Fe^{3+}$, $Mo^{4+}$, $Mo^{6+}$, $Al^{3+}$, $V^{5+}$, $Sr^{2+}$, $W^{4+}$, $W^{6+}$, $Cu^{2+}$, $Cr^{2+}$, $Cr^{3+}$, $Cd^{2+}$, X is at least one anion selected from the group comprising halide, hydroxide, sulfate, carbonate, cyanide, thiocyanate, isocyanate and carboxylate, in particular formate, acetate, propionate, oxalate, nitrate, and m and n are integers which correspond to the valences of $M^1$ and X, to an aqueous solution of a cyanometallate compound of the general formula

in which $M^2$ denotes at least one metal ion selected from the group comprising $Fe^{2+}$, $Fe^{3+}$, $Co^{3+}$, $Cr^{3+}$, $Mn^{2+}$, $Mn^{3+}$, $Rh^{3+}$, $Ru^{2+}$, $Ru^{3+}$, $V^{4+}$, $V^{5+}$, $Co^{2+}$, $Ir^{3+}$ and $Cr^{2+}$ and $M^2$ can be the same as or different from $M^1$, H denotes hydrogen or a metal ion, usually an alkali metal, alkaline earth metal or ammonium ion, A denotes at least one anion selected from the group comprising halide, hydroxide, sulfate, carbonate, ROC=N, thiocyanate, isocyanate, carboxylate or nitrate, in particular cyanide, and A can be the same as or different from X and a, b and c are integers which are selected such that electroneutrality of the cyanide compound is achieved, one or both of the solutions optionally containing at least one water-miscible ligand containing heteroatoms, which is selected from the group comprising alcohols, aldehydes, ketones, ethers, polyethers, esters, ureas, amides, nitriles, sulfides or functionalized polymers as described in U.S. Pat. No. 5,714,428, b) combining the aqueous suspension that is formed in step a) with a water-miscible ligand containing heteroatoms, which is selected from the above group and which may be the same as or different from the ligand of step a), and c) optionally separating the multimetal cyanide compound from the suspension.

In the syntheses of the multimetal cyanide compounds it is advantageous to use the acid as cyanometallate compound, since this avoids the otherwise inevitable formation of a salt as by-product.

These usable cyanometallate hydracids are stable in aqueous solution and have good handling properties. Preparation thereof can be carried out, for example as described in W. Klemm, W. Brandt, R. Hoppe, Z. Anorg. Allg. Chem. 308, 179 (1961), starting from the alkali metal cyanometallate to give, via the silver cyanometallate, the cyanometallate hydracid. Another possibility is to convert an alkali metal cyanometallate or alkaline earth metal cyanometallate by means of an acid ion exchanger to a cyanometallate hydracid, as described in F. Hein, H. Lilie, Z. Anorg. Allg. Chem. 270, 45 (1952), or A. Ludi, H. U. Guedel, V. Dvorak, Helv. Chim. Acta 50, 2035 (1967). Other methods of synthesizing the cyanometallate hydracids are given, for example, in "Handbuch der Praeparativen Anorganischen Chemie", G. Bauer (Editor), Ferdinand Enke Verlag, Stuttgart, 1981.

The concentration of the acid in the solution should be more than 80 wt %, based on the total weight of cyanometallate complexes, preferably more than 90 wt % and more preferably more than 95 wt %.

The ligands containing heteroatoms used are the organic substances described above.

The concentration of the ligands in the suspension should be from 1 to 60 wt %, preferably from 5 to 40 wt % and more preferably from 10 to 30 wt %.

The multimetal cyanides used for execution of the process of the invention can be crystalline or amorphous. By crystalline multimetal cyanides we mean multimetal cyanides whose strongest reflex in the X-ray diffraction pattern has an intensity which is at least three times greater than the background reading. Crystalline multimetal cyanides can be cubic or show X-ray diffraction patterns such as are described in EP-A 755,715. By amorphous multimetal cyanides we mean those multimetal cyanides whose strongest reflex in the X-ray diffraction pattern has an intensity which is less than three times the intensity of the background or which show X-ray diffraction patterns such as are described in EP-A 654,302 and EP-A 743,093.

The multimetal cyanide compounds can be used for the synthesis of the polyether polyols of the invention either in powder form or in the form of shaped particles made by applying them to, or incorporating them in, macroscopic inorganic or organic support materials or shaping them to macroscopic shaped particles.

The aforementioned multimetal cyanide compounds are highly suitable for use in the process of the invention by reason of their high activity. The catalyst is preferably used in a concentration of less than 1 wt %, preferably less than 0.5 wt %, more preferably less than 1000 ppm and most preferably $\leq$500 ppm, based on the total weight of the polyether polyol.

The process of the invention may be carried out continuously or batchwise. Synthesis can be carried out in suspension, in a fixed bed or in a fluidized bed. The temperatures during synthesis are between 50° and 200° C., temperatures between 90° and 150° C. being preferred.

The alkylene oxide that is used can be selected from the group comprising ethylene oxide, propylene oxide, butylene oxide, vinyl oxirane or mixtures thereof, ethylene oxide and propylene oxide being preferably used.

The polyether alcohols produced by the process of the invention preferably have molecular weights ranging from 2,000 to 10,000 g/mol. They are used, in particular, for reaction with isocyanates to form flexible polyurethane foams.

When using the batch starters of the invention the process of, preparing polyetherols with multimetal cyanide compounds shows very good starting characteristics and alkoxylation runs very reliably. By combining the batch starters used in the process of the invention with known batch starters or addition initiators of higher functionality, preferably trifunctional initiators, polyether polyols having functionalities of more than 2 become readily available. Of particularly great industrial significance are polyether polyalcohols used for flexible foams and having OH functionalities of from 2.1 to 2.6, as are industrially preferably used. The process of the invention considerably increases the number of possible applications of catalysis involving multimetal cyanide compounds.

The invention is illustrated below with reference to the following examples.

The hydroxyl values were determined according to DIN 53,240 and the viscosity at 25° C. of the polyols according to DIN 51,550. The unsaturated components were measured by the mercury acetate method specified in ASTM D 4671-87. The determination of zinc and cobalt contents was carried out using atomic emission spectroscopy with inductively coupled plasma (ICP-AES), the detection limit being ca 1 ppm. Gel-permeation chromatography (GPC) was carried out using 3 gel permeation columns (type "PSS gel" containing 5 μm packings, two 100 Å columns and one 500 Å column) and using tetrahydrofuran as mobile phase (1 mL/min) using a refractive index detector. Calibration of the gel-permeation chromatography was carried out using commercial linear polypropylene oxide standards. Data evaluation was carried out using software sold by Polymer Standard Services (PSS), Mainz, German Federal Republic. $M_n$ designates the number-average molecular weight, $M_w$ the weight-average molecular weight and D the polydispersity ($M_w/M_n$).

Preparation of the Multimetal Cyanide Compounds

EXAMPLE 1

1000 mL of strongly acidic ion exchanger (K2431, sold by Bayer) were regenerated twice with 450 g of hydrochloric acid (37% conc.) and then washed with water until the eluate was neutral. A solution of 80.8 g of $K_3[Co(CN)_6]$ in 250 mL of water was then placed on the ion-exchange column. The column was then eluted until the emerging solute was again neutral. The Co:K ratio in the isolated eluate was more than 10:1. The 1269 g of eluate were maintained at a temperature of 40° C. and then a solution of 80.0 g of Zn(II) acetate in 240 g of water was added with stirring. 276.4 g of tert-butanol were then added to the suspension. The suspension was stirred at 40° C. for a further 30 minutes. The solid matter was then filtered off in vacuo and washed with 300 mL of tert-butanol on the filter. The solids thus treated were dried at room temperature.

Preparation of the Polyether Polyols

EXAMPLE 2

Synthesis was effected in a purified and dried stirred reactor having a capacity of 10 L. With the jacket temperature set to 50° C., 113.0 g of butane-1,4-diol were placed in the reactor. The contents of the reactor were then rendered inert by filling it with nitrogen (0–7 bar absolute) three times. A vacuum of less than 1 mbar absolute was applied at 80° C. over a period of 2 hours. The vacuum was released with nitrogen. 5.025 g of catalyst of Example 1 (equivalent to 2000 ppm based on the final product) were introduced into the stirred reactor, and the reactor was rendered inert by filling it with nitrogen under a pressure of 0–7 bar absolute. A vacuum of less than 1 mbar absolute was applied at 80° C. for a period of 30 minutes. Following evacuation of the reactor, 100 g of propylene oxide were metered in at 125° C. There was achieved a pressure of 1.7 bar absolute, which fell 25 minutes after commencement of the propylene oxide feed, thus indicating the start-up of the reaction. Another 2300 g of propylene oxide were then metered in at the same temperature over a period of 2.5 hours. The maximum pressure was 3.4 bar absolute and stirring was continued at 125° C. over a period of 15 minutes.

On completion of the reaction, a water-jet vacuum was applied at 125° C. over a period of 30 minutes. Separation of the catalyst was carried out by filtering through a double layer of a Seitz deep bed filter.

The resulting polyetherol had the following characteristics: hydroxyl value: 52 mg of KOH/g, viscosity at 25° C.: 397 mpa·s, unsaturated components: 0.0051 meq/g, zinc content: 11 ppm, cobalt content: 5 ppm.

Molecular weight determined by gel-permeation chromatography (GPC): $M_n$: 1958 g/mol, $M_w$: 2006 g/mol, D: 1.025.

EXAMPLE 3

Synthesis was effected in a purified and dried stirred reactor. having a capacity of 10 L. At room temperature, 226.5 g of butane-1,4-diol were fed to the reactor, whose jacket temperature was 50° C. The contents of the reactor were then rendered inert by filling it with nitrogen three times under a pressure of 0–7 bar absolute. A vacuum of less than 1 mbar absolute was applied at 85° C. over a period of 2 hours. The vacuum was released with nitrogen. 2.518 g of catalyst as used in Example 1 (equivalent to 500 ppm based on the final product) were introduced into the stirred reactor and the reactor was rendered inert by filling it with nitrogen three times under a pressure of 0–7 bar absolute. A vacuum of less than 1 mbar absolute was applied at 85° C. for a period of 30 minutes. Following evacuation of the reactor, 240 g of propylene oxide were metered in at 125° C. while the pressure rose to 5.548 bar absolute. The pressure fell within 8 minutes following commencement of the propylene oxide feed, indicating the start-up of the reaction. Another 4569.2 g of propylene oxide were then fed in at a temperature of 125° C. over a period of 3 hours and 52 minutes, after which stirring was continued for 35 minutes at 125° C.

On completion of the reaction (at 125° C.), a water-jet vacuum was applied over a period of 15 min. Separation of the catalyst was carried out by filtering through a double layer of a Seitz deep bed filter.

The resulting polyetherol had the following characteristics: hydroxyl value: 54.0 mg of KOH/g, viscosity at 25° C.: 380 MPa·s, unsaturated components: 0.0053 meq/g.

Molecular weight as recorded by gel permeation chromatography (GPC): $M_n$: 1926 g/mol, $M_w$: 1983 g/mol, D: 1.030.

EXAMPLE 4

Synthesis was effected in a purified and dried stirred reactor having a capacity of 10 L. At room temperature, 806.1 g of α-hydroxy-ω-hydroxypoly(oxybutane-1,4-diyl) were fed to the reactor, which had a jacket temperature of 50° C. The contents of the reactor were then rendered inert-by filling it with nitrogen three times under a pressure of 0–7 bar absolute. A vacuum of less than 1 mbar absolute was applied at 105° C. over a period of 1 hour. The vacuum was released with nitrogen. 1.253 g of catalyst as used in Example 1 (equivalent to 500 ppm based on the final product) were introduced into the stirred reactor, and the reactor was rendered inert by filling it with nitrogen three times under a pressure of 0–7 bar absolute. A vacuum of less than 1 mbar absolute was applied at 105° C. for a period of 50 minutes. Following evacuation of the reactor, a total of 1703.5 g of propylene oxide were metered in at 125° C. over a period of 3 hours, during which time a maximum pressure of 0.41 bar absolute occurred. 25 minutes after commencement of the propylene oxide feed, the pressure fell, indicating the start-up of the reaction. On completion of metering, stirring was continued for 35 minutes at 125° C.

On completion of the reaction, an oil pump vacuum was applied over a period of 30 min at 125° C. Separation of the catalyst was carried out by filtering through a double layer of a Seitz deep bed filter.

The resulting polyetherol had the following characteristics: hydroxyl value: 55.3 mg of KOH/g, viscosity at 25° C.: 512 mPa·s, unsaturated components: 0.0029 meq/g.

Zinc content: 2 ppm, cobalt content: 1 ppm.

Molecular weight as recorded by gel permeation chromatography (GPC): $M_n$: 1989 g/mol, $M_w$: 2066 g/mol, D: 1.038.

EXAMPLE 5

Synthesis was effected in a purified and dried stirred reactor having a capacity of 10 L. At room temperature, 306.4 g of α-hydroxy-ω-hydroxypoly(oxybutane-1,4-diyl) were fed to the reactor having a jacket temperature of 50° C. The contents of the reactor were then rendered inert by filling it with nitrogen three times under a pressure of 0–7 bar absolute. A vacuum of less than 1 mbar absolute was applied at 105° C. over a period of 1 hour. The vacuum was released with nitrogen. 1.253 g of catalyst as used in Example 1 (equivalent to 500 ppm based on the final product) were introduced into the stirred reactor, and the reactor was rendered inert by filling it three times with nitrogen under a pressure of 0–7 bar absolute. A vacuum of less than 1 mbar absolute was applied at 105° C. for a period of 30 minutes. Following evacuation of the reactor, a total of 2205.0 g of propylene oxide were metered in at 125° C. over a period of 3 hours, during which time the maximum pressure obtained was 0.86 bar absolute, and the reaction started 35 minutes after commencement of the propylene oxide feed. On completion of metering, stirring was continued for 30 minutes at 125° C.

On completion of the reaction, a water-jet vacuum was applied for a period of 30 minutes at 125° C. Separation of the catalyst was carried out by filtering through a double layer of a Seitz deep bed filter.

The resulting polyetherol had the following characteristics: hydroxyl value: 53.7 mg of KOH/g, viscosity at 25° C.: 401 mPa·s, unsaturated components: 0.0067 meq/g.

Zinc content: 2 ppm, cobalt content: 1 ppm.

Molecular weight as recorded by gel permeation chromatography (GPC): $M_n$: 1969 g/mol, $M_w$: 2037 g/mol, D: 1.035.

EXAMPLE 6 (for Comparison)

Synthesis was effected in a purified and dried stirred reactor having a capacity of 10 L. With the jacket temperature set to 50° C., 95.2 g of propane-1,3-diol were placed in the reactor. The contents of the reactor were then rendered inert by filling it three times with nitrogen under a pressure of 0–7 bar absolute. A vacuum of less than 1 mbar absolute was applied at 70° C. over a period of 2 hours. The vacuum was released with nitrogen. 5.025 g of catalyst as used in Example 1 (equivalent to 2000 ppm based on the final product) were introduced into the stirred reactor, and the reactor was rendered inert by filling it with nitrogen three times under a pressure of 0–7 bar absolute. A vacuum of less than 1 mbar absolute was applied at 70° C. for a period of 30 minutes. Following evacuation of the reactor, 280 g of propylene oxide were metered in at 125° C. There was achieved a pressure of 4.8 bar absolute, which remained unchanged over a period of 3 hours. The experiment was stopped.

EXAMPLE 7

Synthesis was effected in a purified and dried stirred reactor having a capacity of 10 L. With the jacket temperature set to 50° C., 260.1 g of pentane-1,5-diol were placed in the reactor. The contents of the reactor were then rendered inert by filling it with nitrogen three times under a pressure of 0–7 bar absolute. A vacuum of less than 1 mbar absolute was applied at 87.5° C. over a period of two hours. The vacuum was released with nitrogen. 9.989 g of catalyst as used in Example 1 (equivalent to 2000 ppm based on the final product) were placed in the stirred reactor., The reactor was rendered inert by filling it with nitrogen three times under a pressure of 0–7 bar absolute. A vacuum of less than 1 mbar absolute was applied at 87.5° C. for a period of 45 minutes. Following evacuation of the reactor, 251 g of propylene oxide were metered in at 125° C. over a period of 13 minutes. There was achieved a pressure of 5.77 bar absolute, which decreased over a period of 15 minutes to 3.65 bar absolute. Metering of the propylene oxide was continued at a rate of 600 g per minute, a maximum pressure of 6.68 bar absolute being established after a further 38 minutes. From this point on, the reaction ran distinctly faster. The chemical feed rate of the propylene oxide was progressively raised to 2800 g/h. The minimum pressure was 0.95 bar absolute, the pressure on completion of the feed of propylene oxide was 1.49 bar absolute. In all, 4743.5 g of propylene oxide were metered in. On completion of the metering of propylene oxide stirring was continued for 10 minutes at 125° C. A constant final pressure of 0.14 bar absolute was established. On conclusion of the reaction, a water-jet vacuum was applied at 105° C. for a period of 10 minutes. Separation of the catalyst was carried out by filtering through a double layer of a Seitz deep bed filter.

EXAMPLE 8 (for Comparison)

Synthesis was effected in a purified and dried stirred reactor having a capacity of 10 L. With the jacket temperature of the reactor set to 50° C., 147.7 g of hexane-1,6-diol were placed in the reactor. The contents of the reactor were then rendered inert by filling it with nitrogen three times under a pressure of 0–7 bar absolute. A vacuum of less than 1 mbar absolute was applied at 80° C. over a period of 2 hours. The vacuum was released with nitrogen. 5.021 g of catalyst as used in Example 1 (equivalent to 2000 ppm based on the final product) were introduced into the stirred reactor, and the reactor was rendered inert by filling it with nitrogen three times under a pressure of 0–7 bar absolute. A vacuum of less than 1 mbar absolute was applied at 80° C. for a period of 30 minutes. Following evacuation of the reactor, 300 g of propylene oxide were metered in at 125° C. There was achieved a pressure of 5.2 bar absolute, which fell over a period of 3 hours to 4.9 bar absolute. The experiment was stopped.

EXAMPLE 9

Synthesis was effected in a purified and dried stirred reactor having a capacity of 10 L. At room temperature, a mixture of 34.72 g of butane-1,4-diol and 163.18 g of a glycerol propoxylate having a molecular mass of 423.4 g/mol was fed to the reactor, which had a jacket temperature of 30° C. The contents of the reator were then rendered inert by filling it with nitrogen three times under a pressure of 0–7 bar absolute. A vacuum of less than 1 mbar absolute was applied at a jacket temperature of the reactor of 100° C. over a period of 1.5 hours. The vacuum was released with nitrogen. 1.55 g of catalyst as used in Example 1 (equivalent to 600 ppm based on the final product) were introduced into the stirred reactor, and the reactor was rendered inert by filling it with nitrogen three times under a pressure of 0–7 bar absolute. A vacuum of less than 1 mbar absolute was applied at a jacket temperature of the reactor of 100° C. for a period of 40 minutes. Following evacuation of the reactor and forced introduction of 0.5 bar of nitrogen, 150 g of propylene oxide were metered in at a jacket temperature of the reactor of 130° C. There was achieved a pressure of 5.75 bar absolute, and the reaction started within less than 5 minutes. Another 2239.2 g of propylene oxide were then fed in at an internal temperature of the reactor of 125° C. over a period of 2 hours and 47 minutes. The final pressure was 1.1 bar absolute and stirring was then continued for a period of 1 hour at 125° C.

On completion of the reaction, a water-jet vacuum was applied at 125° C. for a period of 40 minutes. Separation of the catalyst was carried out by filtering through a double layer of a Seitz deep bed filter.

The resulting polyetherol had the following characteristics: hydroxyl value: 42.5 mg of KOH/g, viscosity at 25° C.: 688 mpa·s, unsaturated components: 0.0052 meq/g.

Molecular weight as recorded by gel permeation chromatography (GPC): $M_n$: 2787 g/mol, $M_w$: 2977 g/mol, D: 1.068.

EXAMPLE 10

Synthesis was effected in a purified and dried stirred reactor having a capacity of 10 L. At room temperature, 253.3 g of butane-1,4-diol were placed in the reactor, whose jacket temperature was 50° C. The contents of the reactor were then rendered inert by filling it with nitrogen three times under a pressure of 0–7 bar absolute. With the jacket temperature set to 90° C., a vacuum of less than 1 mbar absolute was applied for 1.5 hours. The vacuum was released with nitrogen. 4.215 g of catalyst as used in Example 1 (equivalent to 624 ppm based on the final product) were introduced into the stirred reactor; and the reactor was rendered inert by filling it with nitrogen twice under a pressure of 0–7 bar absolute. Following evacuation of the reactor, 201 g of propylene oxide were metered in at a jacket temperature of 125° C. The reaction started 20 minutes after commencement of the propylene oxide feed. The total amount of propylene oxide that was metered in during the total reaction time was 6417.5 g. Following addition of 1040 g of propylene oxide, dropwise addition of 86.2 g of glycerol was commenced at a rate of from 10 to 27 drops per minute. Glycerol was added dropwise under pressures ranging from 0.68 to 0.98 bar absolute over a period of 2 hours and 12 minutes. On completion of the introduction of glycerol, 3875 g of propylene oxide had been metered in. The residual propylene oxide was metered in over a further period of 2 hours and 25 minutes. The final pressure was 1.58 bar absolute and stirring was then continued for 40 minutes at 125° C.

On completion of the reaction, a water-jet vacuum was applied at 125° C. for a period of 40 minutes. Separation of the catalyst was carried out by filtering through a double layer of a Seitz deep bed filter.

The resulting polyetherol had the following characteristics: hydroxyl value: 68.4 mg of KOH/g, viscosity at 25° C.: 331 mPa·s, unsaturated components: 0.0083 meq/g.

Molecular weight as recorded by gel permeation chromatography (GPC): $M_n$: 1684 g/mol, $M_w$: 1837 g/mol, D: 1.091.

EXAMPLE 11

Synthesis was effected in a purified and dried stirred reactor having a capacity of 10 L. At room temperature, 2570.8 g of reaction product of Example 10 were fed to the reactor, whose jacket temperature was 50° C. The contents of the reactor were then rendered inert by filling it with nitrogen three times under a pressure of 0–7 bar absolute. A vacuum of less than 1 mbar absolute was applied at 110° C. over a period of 1 hour. The vacuum was released with nitrogen. 1.560 g of catalyst as used in Example 1 (equivalent to 311 ppm based on the final product) were introduced into the stirred reactor, and the reactor was rendered inert by filling it with nitrogen three times under a pressure of 0–7 bar absolute. A vacuum of less than 1 mbar absolute was applied at 110° C. for a period of 25 minutes. Following evacuation of the reactor, a total of 2453.3 g of propylene oxide were metered in at 125° C. over a period of 3 hours, and the maximum pressure was 0.56 bar absolute prior to the start-up of the reaction and the pressure on completion of metering was 0.99 bar absolute. The reaction started 20 minutes after commencement of the propylene oxide feed. On conclusion of metering, stirring was continued for minutes at 125° C. to give a final pressure of 0.35 bar absolute.

On completion of the reaction, a water-jet vacuum was applied at 105° C. over a period of 30 min. Separation of the catalyst was carried out by filtering through a double layer of a Seitz deep bed filter.

The resulting polyetherol had the following characteristics: hydroxyl value: 35.8 mg of KOH/g, viscosity at 25° C.: 691 mPa·s, unsaturated components: 0.0071 meq/g.

Zinc content: 3 ppm, cobalt content: 1 ppm.

Molecular weight as recorded by gel permeation chromatography (GPC): $M_n$: 2935 g/mol, $M_w$: 3072 g/mol, D: 1.046.

We claim:

1. A process for the preparation of a polyether polyol comprising catalytic reaction of an H-functional initiator with a lower alkylene oxide in the presence of a catalyst, wherein the catalyst comprises a multimetal cyanide compound and the H-functional initiator comprises a mixture of butane-1,4diol and another H-functional initiator, a mixture of α-hydroxy-ω-hydroxypoly(oxybutane-1,4-diyl) and another H-functional initiator, a mixture of pentane-1,5-diol and another H-functional initiator, a mixture of decane-1, 10-diol and another H-functional initiator, a mixture of butane1,4-diol, of α-hydroxy-ω-hydroxypoly(oxybutane-1, 4-diyl), pentane-1,5-diol, and/or decane-1,10-diol and another H-functional initiator, wherein said another H-functional initiator is glycerol and/or trimethylol propane.

2. A process as defined in claim 1, wherein the multimetal cyanide compound used is one of the general formula I

in which $M^1$ is a metal ion, selected from the group comprising $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, M2 denotes a metal ion, selected from the group comprising $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$ and $M^1$ and $M^2$ are identical or different, A is an anion, selected from the group comprising halide, hydroxide, sulfate, carbonate, cyanide, thiocyanate, isocyanate, cyanate, carboxylate, oxalate or nitrate, L denotes a water-miscible ligand, selected from the group comprising alcohols, aldehydes, ketones, ethers, polyethers, esters, ureas, amides, nitrites, and sulfides, b, c and d are selected such that the electroneutrality of the compound is guaranteed, and e is the coordination number of the ligand.

3. A process as defined in claim 1, wherein the alkylene oxide is selected from the group comprising ethylene oxide, propylene oxide, butylene oxide, vinyl oxirane and mixtures of at least two of these compounds.

4. A polyether polyol synthesized according to a process as defined in any of claims 1 to 3.

5. A process for the preparation of a polyurethane by reaction of a polyisocyanate with a compound containing at least two isocyanate-reactive groups, wherein the compound containing at least two isocyanate-reactive groups comprises a polyether polyol as defined in claim 4.

6. A polyurethane synthesized according to a process as defined in claim 5.

* * * * *